March 26, 1968  L. M. JOHNSTON, JR  3,374,870
TRANSMISSION SYNCHRONIZER

Filed Nov. 4, 1965  2 Sheets-Sheet 1

INVENTOR
LAWRENCE M. JOHNSTON, JR.
ATT'Y

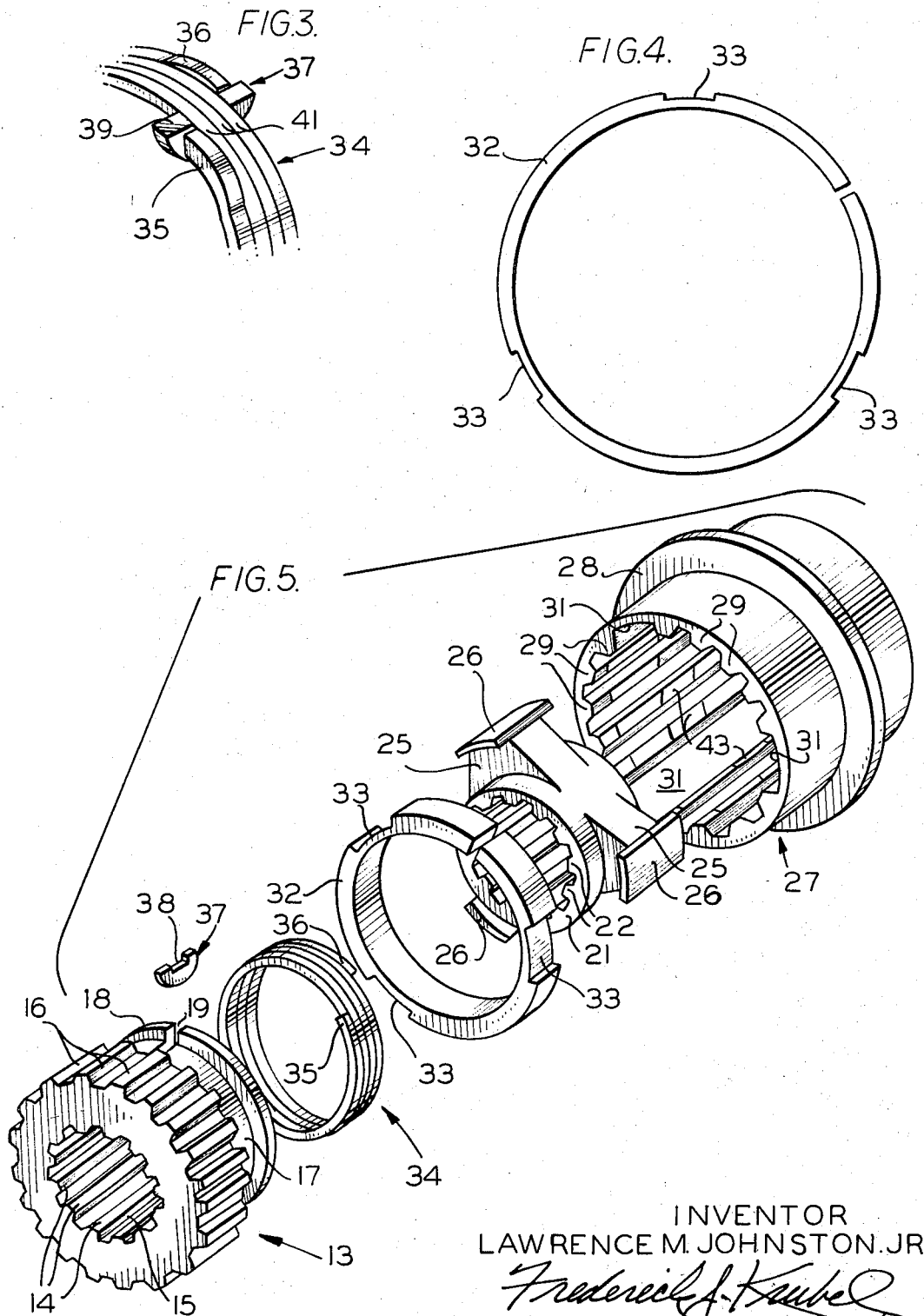

3,374,870
TRANSMISSION SYNCHRONIZER
Lawrence M. Johnston, Jr., Fort Wayne, Ind., assignor to International Harvester Company, a corporation of Delaware
Filed Nov. 4, 1965, Ser. No. 506,320
10 Claims. (Cl. 192—53)

ABSTRACT OF THE DISCLOSURE

A synchronizer clutch mechanism capable of controlling the engagement of two positively engageable clutch elements that form part of a torque delivery path between a driving member and a driven member of a power mechanism and involves a friction clutch of the type including a helically-wound spring capable of being wrapped or radially expanded into frictional or gripping engagement with a flexible strip ring so as to couple the driving and driven members together frictionally.

The present invention relates to a transmission synchronizer and more particularly to a synchronizer based on the principle of a precision spring so arranged as to wrap up into the bore of a split ring and provide the necessary synchronizing force.

Among the objects of the present invention is the provision of a transmission synchronizer for a motor vehicle, such as a truck, utilizing resilient split synchronizing rings which are subjected to the influence of coil wound precision springs. A split ring and precision spring are associated with each of the gears in the transmission chain and cooperate with a sliding clutch to connect the driving and driven shafts for the vehicle. Coaction occurs when the resilient split ring, rotating with the sliding clutch is compressed thereby to frictionally engage the spring and the spring is wound within the resilient split ring.

Another object of the present invention is the provision of a transmission synchronizer wherein the clutch ring, affixed to the main or driving shaft from the vehicle engine, has a hub carrying the precision spring and includes a slot to receive a key providing a reaction member for the ends of the spring. One end of the spring is picked up by the split ring and the spring begins to wrap up in the bore of the split ring while the opposite end of the spring abuts the reaction member to cause rotation of the clutch ring.

A further object of the present invention is the provision of a transmission synchronizer including a split ring and sliding clutch driven by a synchronizer clutch hub which in turn is driven by the transmission main shaft from the rear wheels, and a clutch ring affixed to the main shaft gear and carrying a coil spring and a key therefor. Movement of the sliding clutch toward the clutch ring over the split ring causes the ring to compress and pick up the spring. The spring winds up in the split ring causing it to expand. Once synchronous speeds are attained for the sliding clutch and clutch ring, the spring will relax allowing the split ring to decrease in diameter, and the sliding clutch engages the clutch ring.

The present invention further comprehends the provision of a transmission synchronizer with a precision spring having outwardly bowed ends to provide for ease of frictional contact between the split ring and the spring causing the spring to be wrapped up in the split ring. Also, the bowed ends are normally adjacent a key located in the clutch ring which key provides a reaction member for the psring end not initially picked up by the split ring.

Further objects and advantages of the invention should be apparent to those skilled in the art from the following description when considered in connection with the accompanying drawings illustrating a preferred embodiment thereof.

Figure 1:
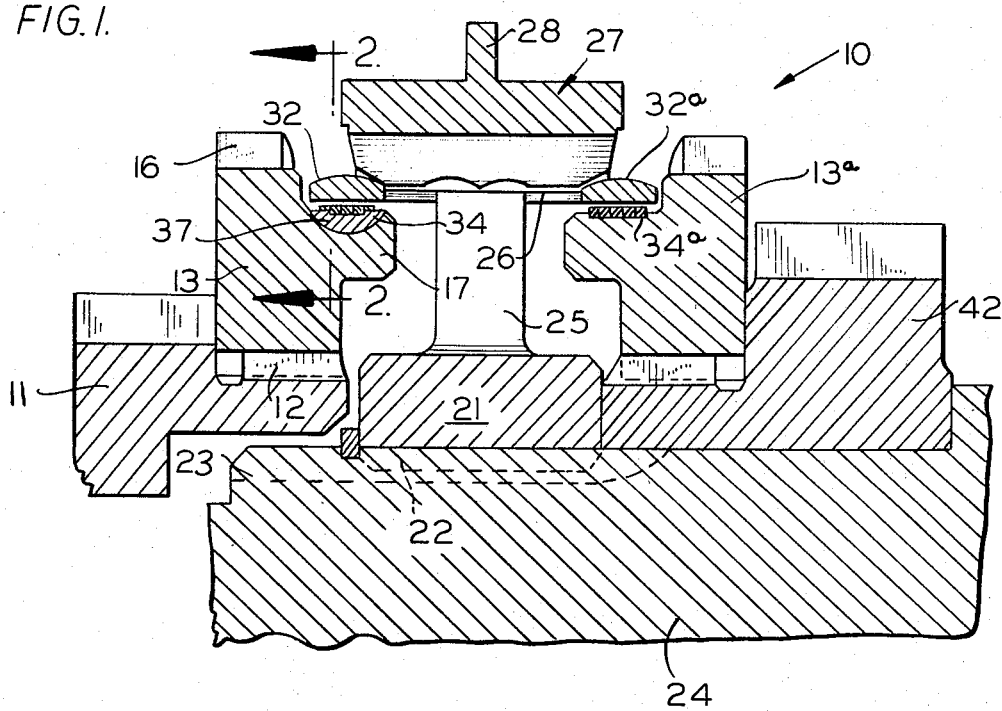
Figure 2:
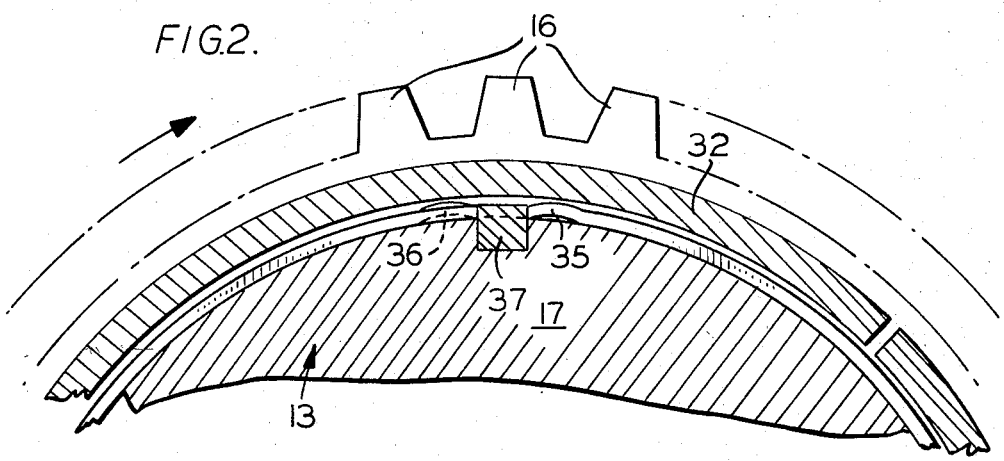

In the drawings:
FIGURE 1 is a partial cross sectional view of a portion of a transmission incorporating the synchronizer of the present invention.
FIG. 2 is a cross sectional view taken on the line 2—2 of FIG. 1 looking in the direction of the arrows.
FIG. 3 is an enlarged partial perspective view of the spring and the key showing the cooperation therebetween.
FIG. 4 is an end elevational view of the resilient split ring utilized in the synchronizer.
FIG. 5 is an exploded perspective view of the transmission and synchronizer showing the component parts and their interrelation.

Referring more particularly to the drawings wherein is disclosed an illustrative embodiment of the present invention, FIG. 1 discloses a portion of a transmission gear train 10 for a motor vehicle having the synchronizer of the present invention in combination therewith. The gear train includes an input gear 11 having external splines 12 which is connected to a clutch ring 13 by internal splines 14 in a central opening 15 in the ring.

The clutch ring 13 includes external splines 16 on the outer periphery thereof and a laterally extending hub 17 having a radial flange 18 and a slot 19 formed in the surface of the hub and flange for a purpose to be later described. A synchronizer clutch hub 21 (FIGS. 1 and 5) has internal splines 22 cooperating with external splines 23 on a transmission main shaft 24 leading to and driving the rear wheels (not shown) of the vehicle. The clutch hub includes three circumferentially spaced radially extending arms 25 terminating in longitudinally extending feet 26. A sliding clutch 27 has a radial flange 28 to be engaged by a forked lever or other suitable means (not shown) to provide longitudinal movement of the clutch. The sliding clutch has an opening extending axially therethrough, with the internal diameter provided with splines 29 and three enlarged longitudinally extending grooves 31 aligned with and receiving the feet 26 on the clutch hub 21.

A resilient split ring 32 has an internal diameter greater than the external diameter of the hub 17 on the clutch ring 13, and includes three grooves or slots 33 on the outer periphery of the ring aligned with and receiving the ends of the feet 26 extending beyond the arms 25 on the clutch hub 21. The split ring 32, sliding clutch 27 and the clutch hub 21 all rotate simultaneously together with the main shaft 24.

A precision coil wound spring 34 has opposite bowed ends 35 and 36 and encompasses and is keyed to the hub 17 of the clutch ring 13; the flange 18 retaining the spring on the hub 17. A generally semi-circular key 37 having a notch 38 on the surface 39 is positioned in the slot 19 in the hub 17 and flange 18 with the turns 41 of the spring 34 received in the notch 38 and the bowed ends 35 and 36 abutting or closely adjacent the key on opposite sides thereof (see FIG. 3). The key 37 provides a reaction member cooperating with the spring during synchronization. The external diameter of the spring and its bowed ends 35, 36 is less than the internal diameter of the resilient split ring 32 in normal expanded condition.

As shown in FIG. 1, an identical clutch ring 13ª is positioned on the opposite side of the clutch hub 21 and is in operative engagement with a gear 42 rotatably mounted on the main shaft 24 and retained against axial movement thereon. A split ring 32ª identical to the ring 32 rotates with the clutch hub 21 and cooperates with an identical spring 34ª for synchronization of the sliding clutch 27 with the clutch ring 13ª and the gear 42.

In operation, the sliding clutch 27 and resilient split ring 32 are driven by the clutch hub 21 which in turn is driven by the transmission main shaft 24 from the rear wheels. During synchronization, the sliding clutch 27 is pushed toward the clutch ring 13 with the sliding clutch moving over the split ring 32 and caming the ring to cause it to decrease in diameter and frictionally engage the spring 34. As the split ring decreases in diameter, the first portion of the spring to be frictionally engaged are the bowed ends 35 and 36 causing the spring end 35 to begin to wrap up within the bore of the split ring. The key 37 will act as a reaction member for the opposite spring end 36 to cause the clutch ring 13 to rotate and approach the rotational speed of the sliding clutch 27.

As the spring is wrapped up into the internal diameter of the split ring 32, the split ring will be forced to expand radially outward, thus providing a blocking action to the sliding clutch preventing engagement between the sliding clutch 27 and the clutch ring 13 until the parts are completely synchronized. As soon as synchronous speeds are attained, the spring 34 will relax allowing the split ring 32 to again decrease in diameter under the impetus of the slding clutch and allowing the sliding clutch 27 to engage the clutch ring 13. Detent notches 43 are provided in the sliding clutch 27 (see FIG. 5) which will tend to hold it into engagement as the split ring expands into them.

If rotation is in the direction opposite to that shown by the arrow in FIG. 2, this rotation of the split ring 32, when decreased in diameter, would provide a friction force on the bowed end 36 of the spring 34 causing a wrap-up similar to that previously described and bowed end 35 would then become the reaction end cooperating with the key 37. Operation of this synchronizer to engage the clutch ring 13ª would obviously be identical to that above described with the sliding clutch moving in the opposite direction. Also, an additional synchronizer can be utilized for other gears in the gear train.

Having thus disclosed the invention, I claim:

1. A synchronizer clutch mechanism for establishment of a driving connection between two members mounted for rotation about a common axis, comprising a clutch mounted on one member to rotate therewith, a clutch hub mounted on the second member to rotate therewith, a sliding clutch carried by the clutch hub and adapted to shift axially thereof, a resilient split ring rotating with said clutch hub and adapted to be engaged by the sliding clutch, said sliding clutch, clutch hub and split ring being operatively connected together so as to rotate in unison, a generally helically-wound, spring mounted on the clutch ring within the resilient split ring, and rotatable therewith, said spring being normally out of engagement with said split ring, and a reaction member on the clutch ring having the ends of the spring normally in abutting engagement therewith.

2. A synchronizer clutch mechanism as set forth in claim 1, in which the reaction member is a key, said clutch ring having a slot therein receiving the key, and said spring having the two ends abutting the key and being wound around the clutch ring and having portions intermediate its ends overlying said key.

3. A synchronizer clutch mechanism as set forth in claim 1, in which said spring has bowed ends abutting the reaction member with the bowed ends being frictionally engaged by the split ring when the ring is decreased in diameter, so that one end is picked up and the spring is wrapped up within the split ring causing a frictional driving connection between the clutch ring and split ring to .eflect rotational speed synchronization between said .clutch hub and clutch ring;

4. A synchronizer clutch mechanism as set forth in claim 1, in which said clutch ring has external splines and said sliding clutch has internal splines engageable with the external splines upon shifting movement of the sliding clutch to provide a positive drive connection between said clutch ring and clutch hub;

5. A synchronizer clutch mechanism for establishment of a driving connection between two members mounted for rotation about a common axis, comprising a clutch ring mounted on one member to rotate therewith, a clutch hub mounted on the second member to rotate therewith, a sliding clutch carried by the clutch hub and adapted to shift axially thereof, a resilient split ring connected to said clutch hub for rotation therewith and adapted to be engaged by the sliding clutch, a coil spring mounted on the clutch ring within the resilient split ring, and a key on the clutch ring cooperating with the spring, said key having a central notch therein, said clutch ring having a slot receiving the key and said spring encompassing the clutch ring and having a plurality of turns received in the notch, said spring having bowed ends adjacent to and normally abutting respective opposite sides of the key, said bowed ends being frictionally engageable by the split ring when the split ring is decreased in diameter, so that one end of the spring is caused to move away from said key and effect radial expansion of the spring within the split ring.

6. A synchronizer clutch mechanism for establishment of a driving connection between two members mounted for rotation about a common axis, comprising a clutch ring mounted on one member to rotate therewith, a clutch hub mounted on the second member to rotate therewith, said clutch hub having equally spaced, radially outwardly extending arms terminating in axially extending feet, a sliding clutch having longitudinal internal grooves receiving said feet whereby said sliding clutch is non-rotatively connected to said clutch hub and is adapted to shift axially thereof, a resilient split ring having peripheral, axially extending grooves also receiving said feet so that the clutch hub, sliding clutch and split ring are capable of rotating simultaneously, said resilient split ring being adapted to be engaged by said sliding clutch, a spring mounted on the clutch ring within the resilient split ring, and a reaction member on the clutch ring cooperating with the spring.

7. A synchronizer clutch mechanism as set forth in claim 6, in which said clutch ring includes external splines on its periphery and an axially extending flanged hub having a slot, the spring being wound around and encompassing the flanged hub and said reaction member being a key having a notch, said key received in said slot in the clutch ring and said notch in the key receiving the turns of the spring, and said sliding clutch having internal splines adapted to engage the splines on the clutch ring upon axial movement of the sliding clutch toward the clutch ring.

8. A synchronizer clutch mechanism as set forth in claim 7, in which said spring has bowed ends abutting said key on opposite sides thereof, and the normal internal diameter of the resilient split ring is greater than the normal external diameter of the spring so the spring and split ring do not normally frictionally engage.

9. A synchronizer clutch mechanism as set forth in claim 8, in which axial movement of the sliding clutch toward the clutch ring causes the internal splines on the sliding clutch to engage and decrease the diameter of the split ring, the split ring frictionally engaging and picking up one bowed end of the spring causing the spring to wrap up within the split ring and the opposite end of the spring to engage the key to cause rotation of the clutch ring to synchronize with the rotation of the sliding clutch and enable the sliding clutch splines to interengage with the clutch ring splines.

10. A synchronizer clutch mechanism as set forth in claim 9, in which said sliding clutch has detent notches to hold it in engagement with the split ring.

References Cited

UNITED STATES PATENTS

| | | | |
|---|---|---|---|
| 2,883,022 | 4/1959 | Clausing et al. | 192—81 X |
| 2,932,373 | 4/1960 | Schmid | 192—53.1 |
| 3,110,382 | 11/1963 | Jones | 192—53.3 |
| 3,158,240 | 11/1964 | Harrington | 192—53.3 |
| 3,239,044 | 3/1966 | Boguslawski | 192—53 |

DONLEY J. STOCKING, *Primary Examiner.*

ARTHUR T. McKEON, *Examiner.*